United States Patent [19]
Stephens

[11] Patent Number: 6,052,374
[45] Date of Patent: *Apr. 18, 2000

[54] METHOD AND APPARATUS FOR DISPATCHING ATM CELLS

[75] Inventor: Donpaul C. Stephens, Pittsburgh, Pa.

[73] Assignee: Fore Systems, Inc., Warrendale, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/730,582

[22] Filed: Oct. 15, 1996

[51] Int. Cl.[7] .................................................. H04L 12/28
[52] U.S. Cl. ........................................ 370/412; 370/428
[58] Field of Search ..................................... 370/351, 359, 370/363, 378, 379, 384, 389, 392, 395, 397, 399, 400, 401, 409, 410, 415, 416, 418, 419

[56] References Cited

U.S. PATENT DOCUMENTS

| | | | |
|---|---|---|---|
| 5,287,202 | 2/1994 | Kumarappan | 358/440 |
| 5,689,512 | 11/1997 | Bitz et al. | 370/395 |

*Primary Examiner*—Huy D. Vu
*Assistant Examiner*—Chiho Andrew Lee

*Attorney, Agent, or Firm*—Ansel M. Schwartz

[57] ABSTRACT

The present invention pertains to an ATM cell interface for dispatching ATM cells, each ATM cell having a header with a VPI field having a value and a VCI field having a value. The interface comprises L input ports to which ATM cells enter the interface, where L is greater than or equal to 1 and is an integer. The interface also comprises Q output ports through which ATM cells exit the interface, where Q is greater than or equal to 1 and is an integer. The interface comprises a memory mechanism 24 having serial access memory management. Additionally, the interface comprises a mechanism for directing the ATM cells from an input port of the L input ports to any desired destination through at least one output port 22 of the Q output ports 22. The directing mechanism 26 has entities which identify desired destinations for a corresponding ATM cell. The entries for the corresponding ATM cell are distributed from each other with at least one of the entries for the corresponding ATM cell separate from all other of the entries for the corresponding ATM cell. The entries are stored in the memory preferably in a same table. The number of possible entries in the directing mechanism 26 is less than a total number of entries supported by the ATM cell header. The present invention pertains to a method for dispatching an ATM cell having an ATM header in an ATM network. The present invention pertains to a telecommunications system.

23 Claims, 7 Drawing Sheets

METHOD AND APPARATUS FOR DISPATCHING ATM CELLS

FIELD OF THE INVENTION

The present invention is related to an ATM network and a method and apparatus for obtaining connection information in regard to ATM cells transmitted on the ATM network. More specifically, the present invention is related to a method and apparatus for efficiently maintaining connection information with the use of standard RAMs through the use of a multiple level table lookup mechanism. The present invention also is related to the secure transmission of ATM cells along an ATM network.

BACKGROUND OF THE INVENTION

In the ATM standard two basic types of connections can be setup each with its corresponding connection identification mechanism:

Nonterminating virtual path connections. In this case only the VPI entry is used to identify the connection.

Terminating virtual path connections. In this case both the VPI and VCI entries are used to identify the connection.

Depending on the location of the forwarding device within an ATM network, incoming connections may be terminating, nonterminated, or a mix of the two. In order to support all possible header entries at such a device, a very large table (i.e. 2^28 or about 256 million entries would be required. However, in the case of nonterminated virtual paths, all possible VCI values are part of a single connection, reserving additional entries is inherently very wasteful. In the case of terminated virtual paths, relatively few of the 2^16 or about 65 thousand possible VCI entries are used per VPI. In most cases, the number of active VCIs varies among the terminated VPIs.

The ability to configure a lookup mechanism in an efficient manner is thus necessary, but not sufficient. In computer networks connections have finite lifetime. When previously active VCIs in a terminated virtual path become idle, it would be desirable to enable the mechanism to reclaim the memory for use by another virtual path. Similarly, it would be desirable for an active virtual path connection to be able to expand its available number of VCI entries upon demand during operation. These operations that manage the table memory should not affect current operation of the mechanism.

The information can be any of (or a combination of) static or dynamic data. Static and dynamic simply refer to the status of the data stored relative to individual cell time. Examples of static data would include routing information and header translation values, these are generally updated in software. Data types that are dynamic in nature could include connection counters, encryption keys, and bandwidth monitoring values. Dynamic data may be changed on every cell arrival time for that connection. This complicates management of the table memory.

Additionally, the connection information should be protected to ensure that only the connection that the information belongs to can access it. This is a requirement for the mechanism to ensure data on a VCI cannot be corrupted by potentially unmapped connections. Furthermore, to implement the mechanism at a low cost, standard RAMs should be usable for storing the information.

Several existing implementations currently use Content Addressable Memories (CAMs) to perform most of the aforementioned functions; however, the amount of logic contained within these memories makes them significantly more expensive than standard RAMs. A prior art mechanism designed to address the problem of ATM cell dispatching (See U.S. Pat. No. 5,479,401) addresses the issue of utilizing standard RAMs, but does not enable provisions for efficient memory management. The present invention overcomes the limitations of the prior art mechanism by providing a means by which memory may efficiently be accessed and managed with the use of standard RAMs while protecting the information from being accessed by connections besides the one with which it is associated.

In the prior art system, every VCI entry would have to be copied to a new location, then have the VCI Index in the VPI table changed to point to this table. This requires time and extra contiguous space on the order of the size of the VCI table. This could be performed by continuous background compression of the VCI tables.

In the present invention, only the active entries in a Range Table need be relocated. The entries represent a block of PerConnection information in a Sub Table. For blocks sizes of 32 connections each, this mechanism could easily speed relocation by a factor of 100 or more. (Actual speedup depends on the size of the PerConnection information, the number of entries grouped into a block in the Sub Table, and the size of the Range Table entries.) Furthermore, because the entries in the Range Table need not be valid (in use), a wider range can be pre-allocated than is necessary without consuming actual space in the Sub Table.

Furthermore, by controlling access to the Sub Table or lowest level table, a secure transmission of ATM cells across an ATM network can be accomplished. Thus, the problem of preventing undesirable parties obtain the ATM cells as they travel along the ATM network can be solved. In addition, encryption techniques can be employed by sending encrypted (or by encrypting) payloads which can only be decrypted by proper access to encryption keys, for instance, in the lowest level table lookup mechanism.

SUMMARY OF THE INVENTION

The present invention pertains to an ATM cell interface for dispatching ATM cells, each ATM cell having a header with a VPI field having a value and a VCI field having a value. The interface comprises L input ports to which ATM cells enter the interface, where L is greater than or equal to 1 and is an integer. The interface also comprises Q output ports through which ATM cells exit the interface, where Q is greater than or equal to 1 and is an integer. The interface comprises a memory mechanism having serial access memory management. Additionally, the interface comprises a mechanism for directing the ATM cells from an input port of the L input ports to any desired destination through at least one output port of the Q output ports. The directing mechanism has entities which identify desired destinations for a corresponding ATM cell. The entries for the corresponding ATM cell are distributed from each other with at least one of the entries for the corresponding ATM cell separate from all other of the entries for the corresponding ATM cell. The entries are stored in the memory preferably in a same table. The number of possible entries in the directing mechanism is less than a total number of entries supported by the ATM cell header.

The present invention pertains to a method for dispatching an ATM cell having an ATM header in an ATM network. The method comprises the steps of locating a table entry in a highest level table lookup mechanism corresponding to a value of a VPI field of the cell. The table entry identifies an intermediate entry in an intermediate level table lookup mechanism having a plurality of intermediate entries. Then there is the step of producing a first signal corresponding to the table entry. Next there is the step of locating the intermediate entry in the intermediate level table lookup mechanism corresponding to the first signal and a value of a VCI field of the cell. The intermediate entry points to a connection entry in a lowest level table lookup mechanism. The lowest level table lookup mechanism having connection entries which identify desired destinations for the ATM cell. The intermediate entries allow access to connection entries in the lowest level table lookup mechanism so the individual connection entries can be stored in any available locations and not contiguously. Then there is the step of producing a second signal corresponding to the intermediate entry. Next there is the step of locating the connection entry in the lowest level table lookup mechanism corresponding to the second signal. Then there is the step of producing a third signal corresponding to the connection entry. Next there is the step of directing the cell to a desired destination corresponding to the third signal.

The present invention pertains to a telecommunications system. The system comprises ATM cells. Each ATM cell has a header. The header comprises a VPI portion having a field which corresponds to a highest level lookup mechanism. The header comprises a VCI portion having a field. The VCI portion has a range portion with a field which corresponds to an intermediate table lookup mechanism and a sub portion with a field which corresponds to a lowest level table lookup mechanism. The system comprises a source which produces the ATM cells. The system comprises a destination which receives the ATM cells. The system comprises an interface which routes the ATM cells. The interface is in communication with the source and destination. The interface has a highest level table lookup mechanism, a second level table lookup mechanism and a lowest level table lookup mechanism.

The present invention pertains to a table lookup mechanism for ATM cells which enables efficient management of connection information within a standard RAM device. A cell header includes a VPI field having a value and a VCI field having a value. The system is comprised of a sequence of tables referenced in decreasing order. The highest level table is referenced by the VPI field, the lowest level table contains the connection information. The number of entries in the lowest level table is less than the total number of entries supported by the ATM cell header.

The first level table lookup is referenced by the VPI. If the VPI is valid, the table entry denotes whether the virtual path is terminating or nonterminating. Entries for nonterminating virtual paths will contain the remainder of the information required to map the VPI through the intermediate tables to a single entry in the lowest level table. Entries for terminating virtual paths will contain an index where valid entries may exist for this path and contain a limit on the high and low bounds on the range.

The address for the second table is found by adding the range to the index stored in the first level table. Entries in the second table need only include an index for the block in the lowest level table. The bounds for the remaining parts of the VCI need not be stored for bounds verification because they are used in their entirety to reference into the block at the lowest level.

Connection information entries in the lowest level (third) table are accessible only by the connection to whom which the information belongs. Valid flags and bound limits on the higher level tables ensure that only valid connections proceed through the mechanism and that they are mapped to their correct entry.

If more than one ATM interface shares access to the table, the port number could be logically appended to the VPI or the VCI thus increasing their effective length. Additional tables may be inserted operating on the VCI, or to provide similar indirection on the VPI.

The present invention pertains to a method of secure transmission of ATM cells. The method comprises the steps of identifying a predetermined VPI associated with a first destination and a first source at an encryption device. Then there is the step of receiving over an ATM network at the encryption device connected to the ATM network the first ATM cell having the VPI from the first source. Next there is the step of checking whether the first ATM cell is from the first source. Then there is the step of transmitting the first ATM cell to the first destination with the encryption device. Next there is the step of receiving at the encryption device a second ATM cell having the VPI from a second source. Then there is the step of checking whether the second ATM cell is from the first source. Next there is the step of discarding the second ATM cell.

The present invention pertains to a method of secure transmission of ATM cells. The method comprises the steps of encrypting a payload of an ATM cell to form an encrypted payload. Next there is the step of transmitting over an ATM network the ATM cell to an encryption device connected to the ATM network. Then there is the step of receiving the ATM cell at the encryption device. Next there is the step of checking with the encryption device that the ATM cell has a proper VPI. Then there is the step of obtaining a encryption key in the encryption device associated with the VPI. Next there is the step of encrypting the encrypting payload with the encrypting key to form a decrypted payload. Next there is the step of transmitting the decrypted payload to a destination.

The present invention pertains to a system for secure transmission of ATM cells. The system comprises a source which produces an ATM cell. The system comprises an ATM network over which an ATM cell is transmitted. The source is connected to the ATM network. The system comprises an encryption device connected to the source and the ATM network. The encryption device transmits an ATM cell to and receives an ATM cell from the ATM network. The encryption device has an encryption key associated with a VPI for the source. The encryption device encrypts or decrypts the ATM cell only if the ATM cell has been received by the encryption device from the source and if the ATM cell has the VPI. The system comprises a destination connected to the ATM network and the encryption device for receiving the encrypted cell from the encryption device through the network.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
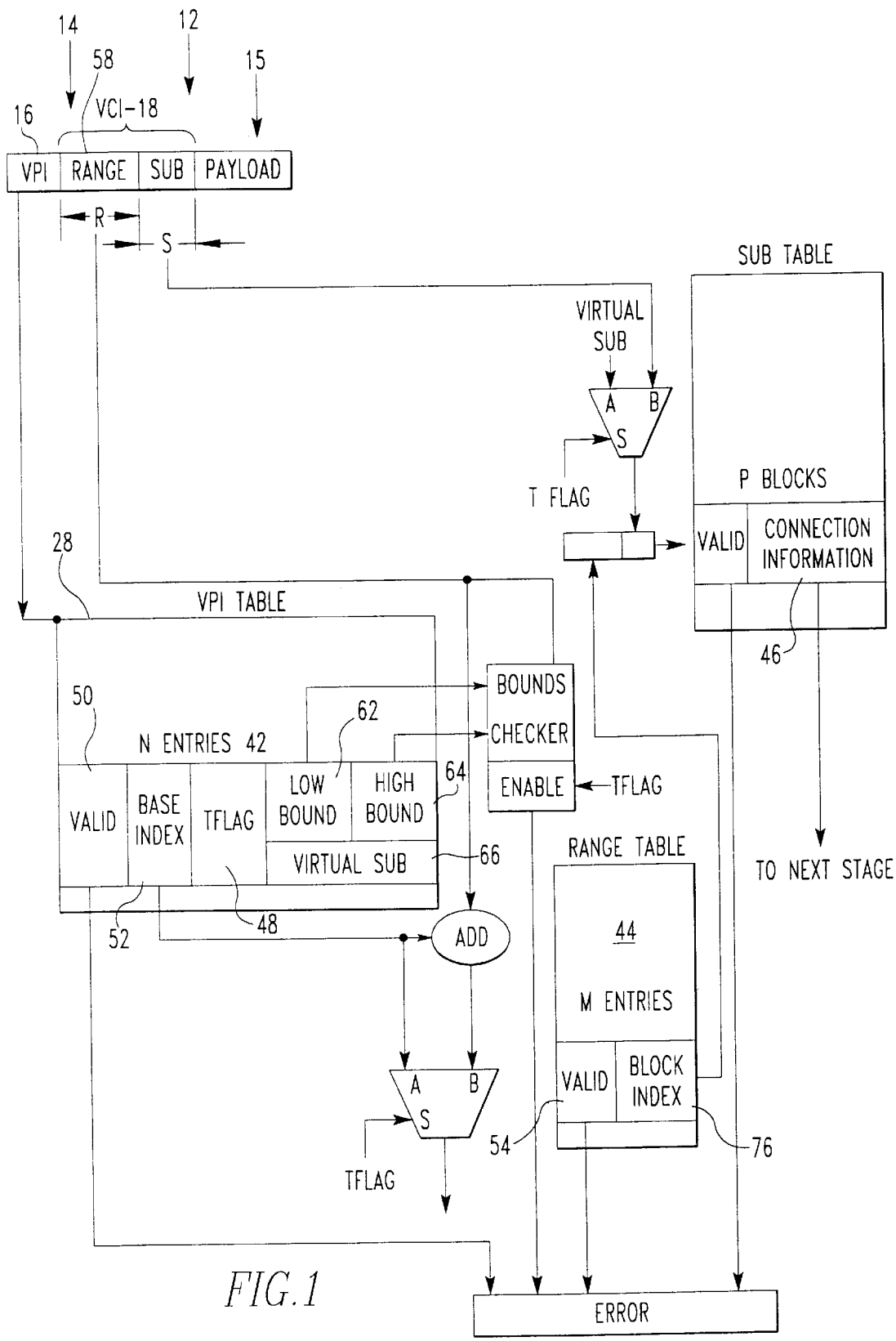
FIG. 1 is a schematic representation of an ATM cell interface having a highest, intermediate and lowest level table lookup mechanism.
Figure 1A:
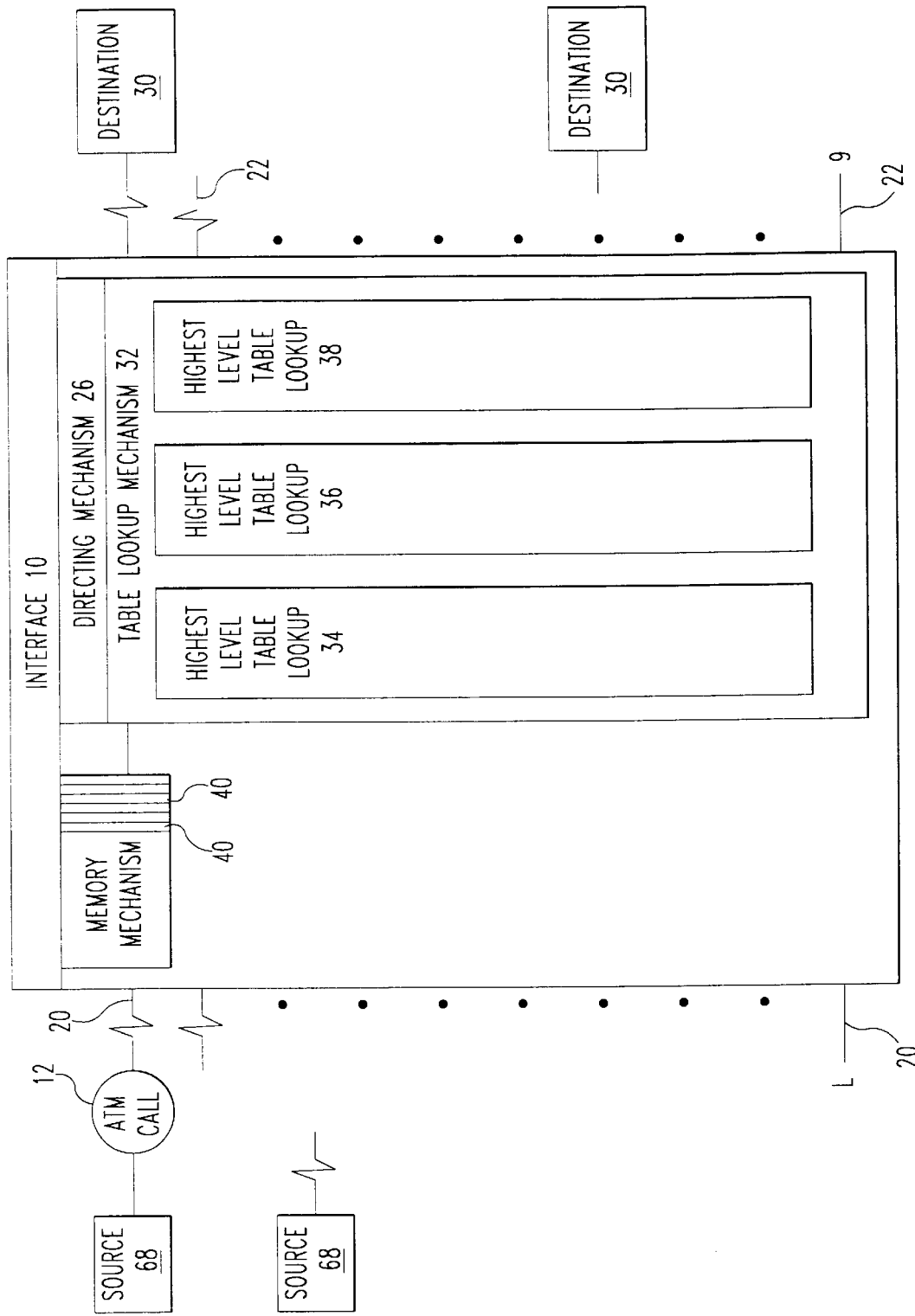
FIG. 1a is a schematic representation of a system of the present invention.

Referring now to the drawings wherein like reference numerals refer to similar or identical parts throughout the several views, and more specifically to FIG. 1a thereof, there is shown an ATM cell interface 10 for dispatching ATM cells 12, each ATM cell 12 having a header with a VPI 16 field having a value and a VCI 18 field having a value. The interface comprises L input ports 20 to which ATM cells 12 enter the interface, where L is greater than or equal to 1 and is an integer. The interface also comprises Q output ports 22 through which ATM cells 12 exit the interface, where Q is greater than or equal to 1 and is an integer. The interface comprises a memory mechanism 24 having serial access memory management. Additionally, the interface comprises a mechanism 26 for directing the ATM cells 12 from an input port 20 of the L input ports 20 to any desired destination 30 through at least one output port 22 of the Q output ports 22. The directing mechanism 26 has entities which identify desired destinations 30 for a corresponding ATM cell 12. The entries 28 for the corresponding ATM cell 12 are distributed from each other with at least one of the entries 28 for the corresponding ATM cell 12 separate from all other of the entries 28 for the corresponding ATM cell 12. The entries 28 are stored in the memory. The number of possible entries 28 in the directing mechanism 26 is less than a total number of entries 28 supported by the ATM cell header.

The directing mechanism 26 preferably produces a first signal based on the value of the VPI 16 field, a second signal based on the value of the VCI 18 field and the first signal, and a third signal based on the value of the second signal which is used to route each of the ATM cells 12 from an input port 20 to a desired output port 22. The directing mechanism 26 preferably is a table lookup mechanism 32.

The table lookup mechanism 32 preferably comprises a highest level table lookup mechanism 34 which produces the first signal based on the value of the VPI 16 field; an intermediate level table lookup mechanism 36 which produces a second signal based on the value of the VCI 18 field; and a lowest level table lookup mechanism 38 which produces a third signal based on the value of the second signal. The third signal is for routing each of the ATM cells 12 from an input port 20 to a desired destination 30 through at least one output port 22 of the Q output ports 22. The memory mechanism 24 is preferably comprised of blocks 40 of memory having the entries 28 for the ATM cell 12, the intermediate level allowing access to the blocks 40 of memory such that the blocks 40 of memory need not be contiguous. The intermediate level table lookup mechanism 36 can be comprised of a plurality of intermediate table lookups.

Preferably, the highest level table lookup mechanism 34 has N table entries 42, where N is greater than or equal to 1 and is an integer. Preferably, the intermediate level table lookup mechanism 36 has M intermediate entries 44, where M is greater than or equal to P and P is greater than or equal to 1 and M and P are integers. Preferably, the lowest level table lookup mechanism 38 has P blocks 40 each having at least 1 connection entries 46. Preferably, each of the P blocks 40 contains $2^s$ connection entries 46, where s is the number of bits in the SUB 60 field.

Each table entry preferably has a Tflag 48 field which indicates whether an ATM cell 12 that is to be routed from an input port 20 of the L input ports to a desired one of the any destinations through at least one output port 22 of the Q output ports travels along a terminating or non terminating connection. Additionally, each table entry has a Valid 50 field which indicates whether a value of the VPI 16 field of an ATM cell 12 is defined in the highest local table lookup mechanism 32. Each table entry preferably also has a BASE INDEX 52 having a value of which is used to calculate an address of the intermediate level table lookup mechanism 36. Each table entry preferably has a VIRTUAL SUB 66 field which is used to locate a desired connection entry when an ATM cell 12 travels along a non terminating connection.

Each intermediate entry preferably has an intermediate VALID 54 field which indicates whether the intermediate entry is defined in the intermediate table lookup mechanism 32. Preferably, each intermediate entry has a BLOCK INDEX 56 having a value which specifies the block in the lowest level table lookup mechanism 38 having the desired connection entry.

Preferably, the VCI 18 field of each ATM cell 12 has a Range 58 value which is used to locate a desired intermediate entry and a SUB 60 value which is used to locate a desired connection entry when the Tflag 48 field indicates an ATM cell 12 travels along a terminating connection. Each table entry preferably has a LOW BOUND 62 and a HIGH BOUND 64 whose values define a bound of acceptable Range 58 values for a given VPI 16 value. The Range 58 value is added to the BASE INDEX 52 to identify an address of an intermediate entry.

The present invention pertains to a method for dispatching an ATM cell 12 having an ATM header in an ATM network. The method comprises the steps of storing a first connection entry which identifies a first destination for the ATM cell 12 having the ATM header in serial manner in a first location of a memory mechanism 24. Then there is the step of storing a second connection entry which identifies a seconded destination for the ATM cell 12 having the ATM header in a serial manner in the memory mechanism 24 at a second location which is not contiguous and separate and apart from the first location. Next there is the step of receiving an ATM cell 12 having the ATM header at the ATM cell interface 10. Then there is the step of reading the first connection entry. Next there is the step of routing the ATM cell 12 to the destination 30 identified in the first connection entry.

Preferably, after the routing step there is the step of adding a third connection entry which identifies a third destination for ATM cells 12 having the ATM header in a serial manner in the memory mechanism 24 at a third location which is not contiguous with and separate and apart from either the first or second locations.

Preferably, after the receiving step, there are the steps of producing a first signal based on the value of a VPI 16 field of the ATM header. Then there is the step of producing a second signal which designates the first connection entry based on the value of the VCI 18 field. Next there is the step of producing a third signal based on the value of the second signal and the first connection entry. Also, the routing step preferably includes the step of routing the ATM cell 12 to the destination 30 identified in the first connection entry with the third signal.

Preferably, the step of producing the first signal includes the steps of locating a table entry in a highest level table lookup mechanism 34 corresponding to the value of the VPI 16 field of the ATM header. Then there is the step of producing a first signal corresponding to the table entry. Additionally, the step of producing the second signal includes the steps of locating an intermediate level entry in an intermediate level table lookup mechanism 36 corresponding to the value of the VCI 18 field of the ATM header. The intermediate level entry points to a connection entry of a lowest level table lookup mechanism 38. Next there is the step of producing a second signal corresponding to the intermediate level entry. The step of producing the third signal, preferably includes the steps of locating the connection entry based on the value of the second signal. Then there is the step of producing the third signal based on the first connection entry.

The present invention pertains to a method for dispatching an ATM cell 12 having an ATM header in an ATM network. The method comprises the steps of locating a table entry in a highest level table lookup mechanism 34 corresponding to a value of a VPI 16 field of the cell 12. The table entry identifies an intermediate entry in an intermediate level table lookup mechanism 36 having a plurality of intermediate entries 44. Then there is the step of producing a first signal corresponding to the table entry. Next there is the step of locating the intermediate entry in the intermediate level table lookup mechanism 36 corresponding to the first signal and a value of a VCI 18 field of the cell 12. The intermediate entry points to a connection entry in a lowest level table lookup mechanism 38. The lowest level table lookup mechanism 38 having connection entries 46 which identify desired destinations for the ATM cell 12. The intermediate entries 44 allow access to connection entries 46 in the lowest level table lookup mechanism 38 so the individual connection entries 46 can be stored in any available locations and not contiguously. Then there is the step of producing a second signal corresponding to the intermediate entry. Next there is the step of locating the connection entry in the lowest level table lookup mechanism 38 corresponding to the second signal. Then there is the step of producing a third signal corresponding to the connection entry. Next there is the step of directing the cell 12 to a desired destination 30 corresponding to the third signal.

The present invention pertains to a telecommunications system. The system comprises ATM cells 12. Each ATM cell 12 has a header. The header comprises a VPI 16 portion having a field which corresponds to a highest level lookup mechanism. The header comprises a VCI 18 portion having a field. The VCI 18 portion has a Range 58 portion with a field which corresponds to an intermediate table lookup mechanism 32 and a sub portion with a field which corresponds to a lowest level table lookup mechanism 38. The system comprises a source 68 which produces the ATM cells 12. The system comprises a destination 30 which receives the ATM cells 12. The system comprises an interface which routes the ATM cells 12. The interface is in communication with the source 68 and destination 30. The interface has a highest level table lookup mechanism 34, a second level table lookup mechanism 32 and a lowest level table lookup mechanism 38.

In the operation of the preferred embodiment, there is a table lookup mechanism 32 for ATM cells 12 which enables efficient management of connection information within a standard RAM device. (Much of the underlying context for the techniques described herein can be found in U.S. Pat. No. 5,479,401, incorporation by reference.) A cell header includes a VPI 16 field having a value and a VCI 18 field having a value. If the virtual path connection is nonterminating, the VPI 16 field uniquely identifies the connection. If the virtual path connection is terminating, both the VPI 16 field and the VCI 18 field identify the connection. Nonterminating virtual path connections require a single entry of connection information to be stored in the tables, whereas terminating virtual path connections require an entry for every VCI 18 that is currently in use within that VPI 16.

The segmented system employs at least three logical tables, which may physically be located in one or more RAM devices. The tables are accessed logically from highest to lowest level. The highest level corresponds to the VPI 16. The connection information is stored at the lowest level lookup table. The number of entries in the lookup mechanism is less than the total number of entries supported by the ATM cell header.

The mechanism manages the lowest level table in blocks 40 which may be of fixed size. Access to the blocks 40 are managed by one or more tables between the highest and lowest level table. The intermediate tables are used to enable a terminated virtual path connection to utilize multiple blocks 40 in the lowest level table. These blocks 40 need not be contiguous and does not require that any blocks 40 be reserved for a terminated virtual path in excess of its current need.

For purposes of this lookup mechanism, the VCI 18 is treated as if it consists of 2 parts, a Range 58 and a SUYB 60 field.

The VPI 16 field is used to access the first table. If the connection is an unterminated virtual path, the base address stored in the first table will provide the complete address for the second lookup. If the connection is a terminated virtual path, the Range 58 will be added to the base address to provide the address for the second lookup. The second lookup obtains the address of the block in the lowest layer table. The offset within the block of the lowest layer table is the SUB 60 or VIRTUAL SUB 66 field, depending on the whether the connection is terminating or nonterminating respectively. The connection information is located at this address.

More specifically, FIG. 1 shows a simple embodiment of the invention. One logical port is utilizing the table and a single intermediate table is used to manage the connection information in fixed sized blocks 40.

The first level table, or VPI table, has N entries, where N>=1 and is an integer. In the preferred embodiment, N is 2^14 thus enabling access to the full range of VPI 16 entries for the device. Each table entry has a Tflag 48 field indicates whether the virtual path is terminating or nonterminating. A Valid 50 field which indicates whether the VPI 16 field value of a cell 12 is defined in the first level table. Each table entry is also composed of a BASE INDEX 52, the value of which is used to calculate the address of the second level table.

If the connection is a terminated one, the first level table will contain both a LOW BOUND 62 and a HIGH BOUND 64 whose values define a range of acceptable Range 58 values for a given VPI 16 value. The value of the Range 58 will be added to the BASE INDEX 52 to form the address of the second level table, or range table.

If the connection is nonterminated, the VCI 18 is by definition not used to identify the connection at this point in the network. For this reason, the SUB 60 portion of the VCI 18 of the incoming cell 12 cannot be used, thus a VIRTUAL SUB 66 is stored in the first level table to perform this function later. For such connections, the BASE INDEX 52 completely specifies the address of the second level table.

Because the VIRTUAL SUB 66 field is only used for nonterminated connections whereas the LOW BOUND 62 and HIGH BOUND 64 are only used for terminated connections, they may be stored in the same portion of the first level table. The Tflag 48 value will identify which is present, as it controls the use of the fields.

The third level table, or Sub Table, is composed of P blocks 40 of size $2^s$ entries, where P is an integer and s is the number of bits in the sub field. The third level table thus contains $P*2^s$ entries. The second level table has M entries, where M>=P and is an integer. Additional entries may be present in the second table to enable faster memory management.

A Valid 50 field indicates whether the entry is defined in the second level table. Each second level table entry is also composed of a BLOCK INDEX 56, the value of which specifies the block in the third level table.

The element within the block of units in the third level table is specified by the Sub or VIRTUAL SUB 66 field, depending on the value of the Tflag 48 (terminating or nonterminating respectively). The third level table has P entries, where P>=1. The number of entries grows in units of $2^s$, where s is the number of bits in the SUB 60 field. A Valid 54 field which indicates whether the entry is defined in the third level table. The Connection Information field, storing any form or collection of static and/or dynamic data is stored here as well.

Size of Fields s—This is the size of the value that will index into the blocks 40 within which memory may be managed in the third level table.

r—The remaining number of bits left in the VCI

Valid—this denotes a binary value (valid or invalid) and thus requires only one bit (per entry in all tables)

Base Index—An n-bit number that is potentially used in conjunction with the Range 58 value of the incoming VCI 18 (if a terminating virtual path) to index into the second level table. The actual value for n depends on how large the second level table is to be.

Tflag—this denotes a binary value (terminating or non-terminating Virtual Path connections) and thus requires only one bit per entry the first level table Low Bound and High Bound—depending on the desired granularity of the bounds, these can consume up to r bits each if full granularity of the bounds is desired.

One potential alternative is for either (or both) bounds to be implicit, in which case they need not be stored, but the bound cannot be modified. If both bounds are fixed, the number of elements in the Range Table will be fixed per nonterminating virtual path.

Another alternative would be for the bound values to denote an order of magnitude for r, ie a bound of a power of 2 or another number. These mechanisms trade space efficiency for accuracy.

Virtual Sub—This is the same size as that chosen for s above.

Note that because VIRTUAL SUB 66 and the bounds (LOW BOUND 62 and HIGH BOUND 64) can occupy the same physical location in memory per entry in the first level table that the larger of the two is the size to store either.

Block Index—An m-bit number that is used to specify the block of entries in the third level table where the connection information is stored. The actual value for m depends on how large the third level table is to be.

Connection Information—This field is generic and is highly dependent on how it is to be used. It is possible for this field to be updated as each cell 12 goes through the above described mechanism. This information can consist of multiple words of memory.

In this mechanism, the size of the lowest level table is proportional to the total number of connections that need to be supported for a given interface and in realistic cases is far less than the range of all possible entries supported by the ATM cell header.

Error cases such as nonvalid entries in any table or the cell's Range being out of bounds are flagged with the Error flag and are used to determine whether the incoming cell 12 belonged to an existing and valid connection (that is a connection has been set up).

The VPI 16 is used to address into the first level lookup table. The Valid 50 field denotes whether the corresponding table entry has been established in the first level table. An error signal will be produced if this table entry is not valid. If the Tflag 48 denotes the VPI 16 is a terminated virtual path, the cell's Range 58 value is checked to see if it is within the bounds delinitated by LOW BOUND 62 and HIGH BOUND 64. An error signal will be produced if the Range is outside of these bounds.

If the Tf lag 48 denotes the VPI 16 is a terminated virtual path, the address of the second table is created by adding the cell's Range 58 to the BASE INDEX 52 stored in the first table. Otherwise, the address of the second table is completely specified by the BASE INDEX 52. The Valid 50 field denotes whether the corresponding table entry has been established in the second level table. An error signal will be produced if this table entry is not valid. The BLOCK INDEX 56 field of the second level table specifies the block of entries in the third level table where the Connection Information is stored.

If the Tf lag 48 denotes the VPI 16 is a terminated virtual path, the cell's SUB 60 value is used to index into the block of entries (specified by the BLOCK INDEX 56) to form the address for the third level table. Otherwise, the VIRTUAL SUB 66 value is used to index into the block of entries. The Valid field denotes whether the corresponding table entry has been established in the third level table. An error signal will be produced if this table entry is not valid. The Connection Information is stored here.

Nonterminating virtual paths use the BASE INDEX 52 as the complete address of the entry in the second level table. Unique VIRTUAL SUB 66 fields are required to ensure they have unique entries in the lowest level table. As many nonterminated virtual paths as there are entries in a block [which is $2^s$] may share a single entry in the Range Table (provided they have unique VIRTUAL SUB 66 values). This enables nonterminating connections to utilize a single entry apiece in the lowest level table. Moreover, nonterminating connections utilize blocks 40 in the lowest level table only as required. Because entries in intermediate tables may be shared, no space need be wasted to support nonterminated virtual path connections.

In the case of a terminated connection, the VPI 16 will use a range of entries in the Range Table from (Base Index+Low Bound) to (Base Index+High Bound). It is preferred that this range of entries is used only by this VPI 16, only nonterminated virtual paths should share an entry in intermediate tables. It is preferred that only a single Range Table entry correspond to a given block of entries in the Sub Table.

These restrictions save significant amount of data that would otherwise be required to verify the correct "owner" of the underlying data. Otherwise, an indicator needs to be stored per entry to identify the valid source 68.

The basic mechanism used herein is fixed sized blocks 40 of memory that are addressed by a multitude of entities through a lookup mechanism that provides protection between users. It should be noted that these mechanisms are similar to those employed in virtual memory systems in CPUs. See Hennessy & Patterson, *Computer Architecture a Quantitative Approach* Second Edition, for some examples of page tables in a virtual memory system, incorporated by reference. If desired, multiple additional levels of paging may be inserted. The entities being paged herein are connection identifiers (VCI 18 and optionally the VPI 16 as well), not memory addresses. The resultant output of the system is not necessarily a new memory address, but a field of data particular to that connection. Another key differentiator is that in computer networks, such as ATM, connections may be completely specified by only part of their header (the VPI 16 in the case of nonterminating connections). To enable efficient use of the lowest layer table, this mechanism maintains data to complete the lookup should the remainder of the data be irrelevant.

A high level description of the algorithm (assuming a pointer to a connection structure is returned by the table 1) can be laid out as written in.

TABLE 1

```
index1 = get_VPI_from_header;
range = get_Range_from_VCI_in_header;
sub = get_sub_from_VCI_in_header
entry1 = lookup_table1[index1];
valid1 = get_valid_bit_from_entry1;
if(valid1 = 0)
{
    error = 1;
} else {
    error = 0;
}
Tflag = get_path_flag_from_entry1;
if(Tflag == 1)
{
    if((Range >= get_lower_bound_from_entry1) &&
        (Range <= get_high_bound_from_entry1))
    {
        index2 = get_base_index_from_entry1 + Range;
    } else {
        error = 1;
    }
} else {
    Vsub = get_virtual_sub_from_entry1;
    index2 = get_base_index_from_entry1;
}
entry2 = lookup_table2[index];
valid2 = get_valid_bit_from_entry2;
if(valid2 == 0)
{
    error = 1;
}
if(Tflag == 1)
{
    index2 = (((get_block_index_from_entry2) << s) + Sub);
} else {
    index2 = (((get_block_index_from_entry2) << s) + Vsub);
}
entry3 = lookup_table3[index3];
valid3 = get_valid_bit_from_entry3;
if(valid3 == 0)
{
    error = 1;
}
if (error == 0)
{
```

TABLE 1-continued

```
    pointer = get_pointer_from_entry_3;
    return(pointer);
} else {
    return(ERROR);
}
```

It should be noted that the Range Table stores a sequence of pointers (Block Indicies), not actual data for the individual connections. Because no actual data need be stored in this (or additional) intermediate tables, multiple connections can safely share entries in intermediate tables. Additionally, these intermediate tables may be modified, resized, and moved completely transparent to external users (ports). While the lowest level table is managed in blocks 40, intermediate tables carry no such restriction. This flexibility in management of the intermediate tables is possible because their modification can be performed transparent to users. For sake of implementation, intermediate tables may be managed in blocks 40.

If minimal size of the intermediate tables is important, only enough entries need be present in them to address the number of underlying blocks 40 in the lowest layer table. If speed of modifying the number of blocks 40 accessible to a VPI 16 is more important, additional entries may exist in the intermediate tables than are necessary to address the underlying blocks 40. Additional entries that are currently not in use need simply be marked invalid.

Nonterminated virtual paths may simultaneously use separate entries in the same block. Additional blocks 40 will be allocated to nonterminated virtual paths only after the blocks 40 currently allocated to them have been fully used. Additional blocks 40 will similarly be allocated to terminated virtual paths only after they have fully utilized the entries in the previously allocated blocks 40. The use of fixed sized blocks 40 as a uniform means of memory management ensures that VPIs can enter and leave the system without causing fragmentation to the lowest level table.

When multiple input ports are present with respect to a given table lookup mechanism 32, use of the table may be multiplexed by them by a variety of methods. If the first level table has enough entries to support any VPI 16 from any of the multiple input ports connected to it, the port number may be logically appended to the VPI 16 to access the highest level table. Because there are only 4096 possible VPI 16 values, dedicating the full range of VPI 16 entries per port may be acceptable. However, if not enough entries exist in the VPI 16 table to support any mapping, a paging mechanism similar to the one used to manage the VCI 18 space may be done on the VPI 16 space among the ports. Two examples of the multiplexing for the VPI 16 table are shown in FIG. 2.

Figure 2A:
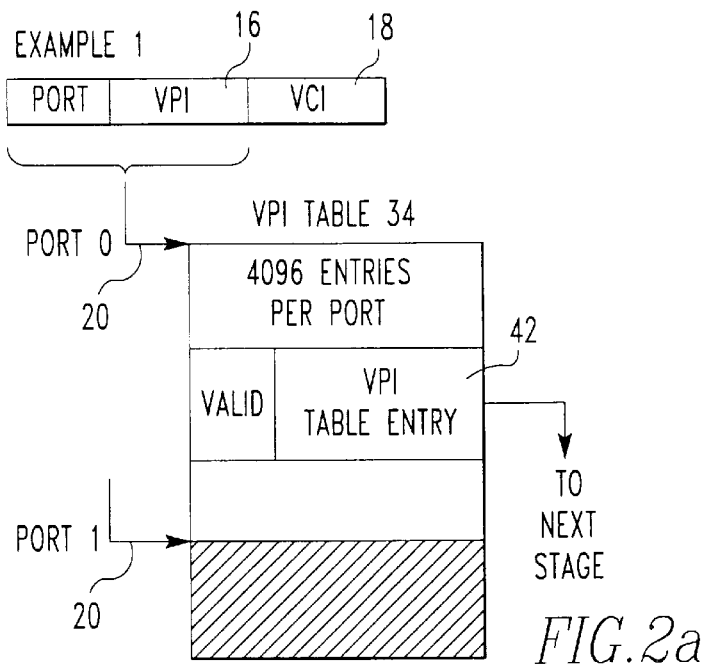
FIG. 2a is a schematic representation of a first example regarding multiple input ports and multiplexing of an ATM interface of the present invention.

Example 1, as shown in FIG. 2a, simply shows the case where the full VPI 16 space is allocatable to each port.

Figure 2B:
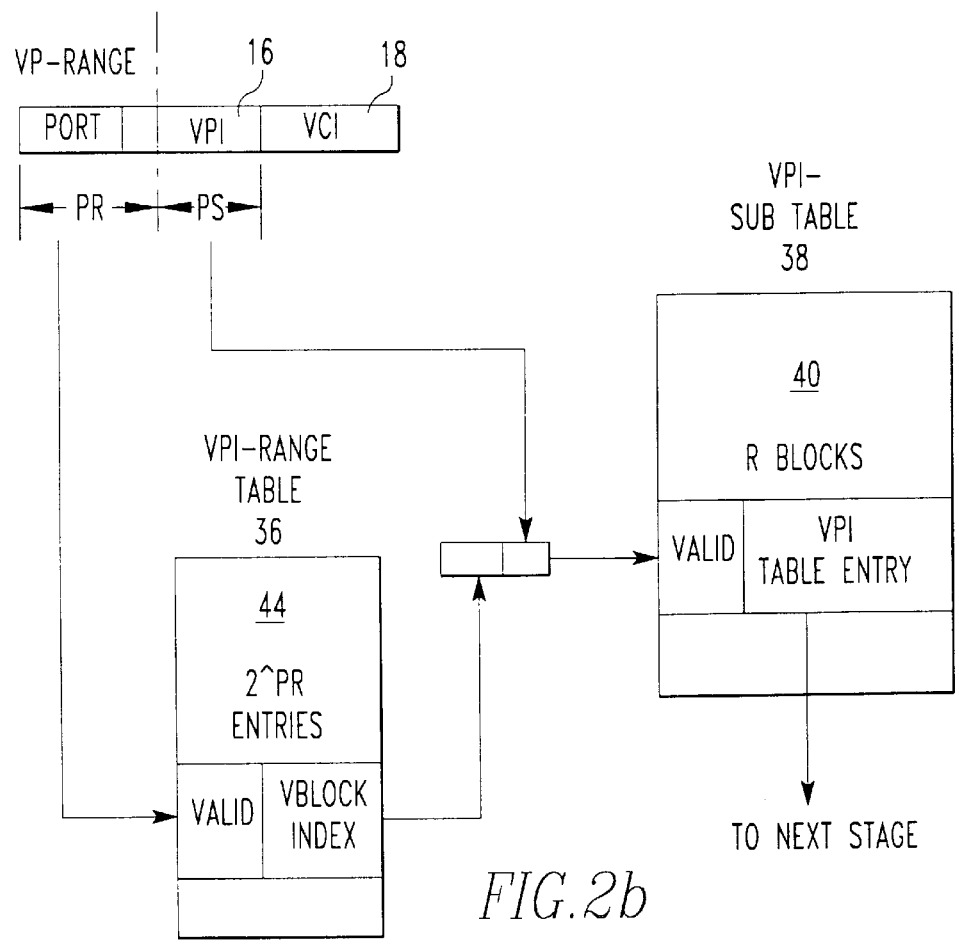
FIG. 2b is a schematic representation of a second example regarding multiple input ports and multiplexing of an ATM interface of the present invention.

Example 2, as shown in FIG. 2b, logically uses the bits representing the port number as an extension to the VPI 16. The VPI-Range Table has 2^PR entries. The VP-Sub Table has R blocks 40, where R<=2^PR (If R=2^PR, then no memory is being saved, and the extra lookup should be eliminated.).

However, preferably the remaining levels of table entries 42 may be shared by the ATM cells 12 from various input ports connected to the first level table. The remaining levels can be used to enable the lowest level table to be efficiently managed not just between VPIs, but between ports as well.

No changes are required to the intermediate tables to enable this functionality.

While a simple implementation of this mechanism need only utilize one intermediate table between the highest and the lowest, multiple intermediate tables may be used to improve the speed and/or efficiency of the memory management. When multiple intermediate tables are used, the entity being paged (VCI 18 and/or VPI 16) will be divided into multiple Range Units and a SUB 60 field, these components are non-overlapping. Each Range Unit will correspond to a separate intermediate table.

The address for successive tables is found by adding the range Unit corresponding to that table to the index stored in the previous table. Each intermediate table, except the last, will contain a high and low bounds to denote the valid bounds of values for the Range Unit that corresponds to the next level table. The last intermediate table does not require bound entries because the SUB 60 field is used in its entirety to reference into the lowest level table.

If multiple intermediate tables are present, the VIRTUAL SUB 66 would be extended to perform the functions of the additional Range Units. The first table may use an implicit range (zero is used above) to eliminate the need for the VIRTUAL SUB 66 to contain an effective Range for the first table.

Figure 3:
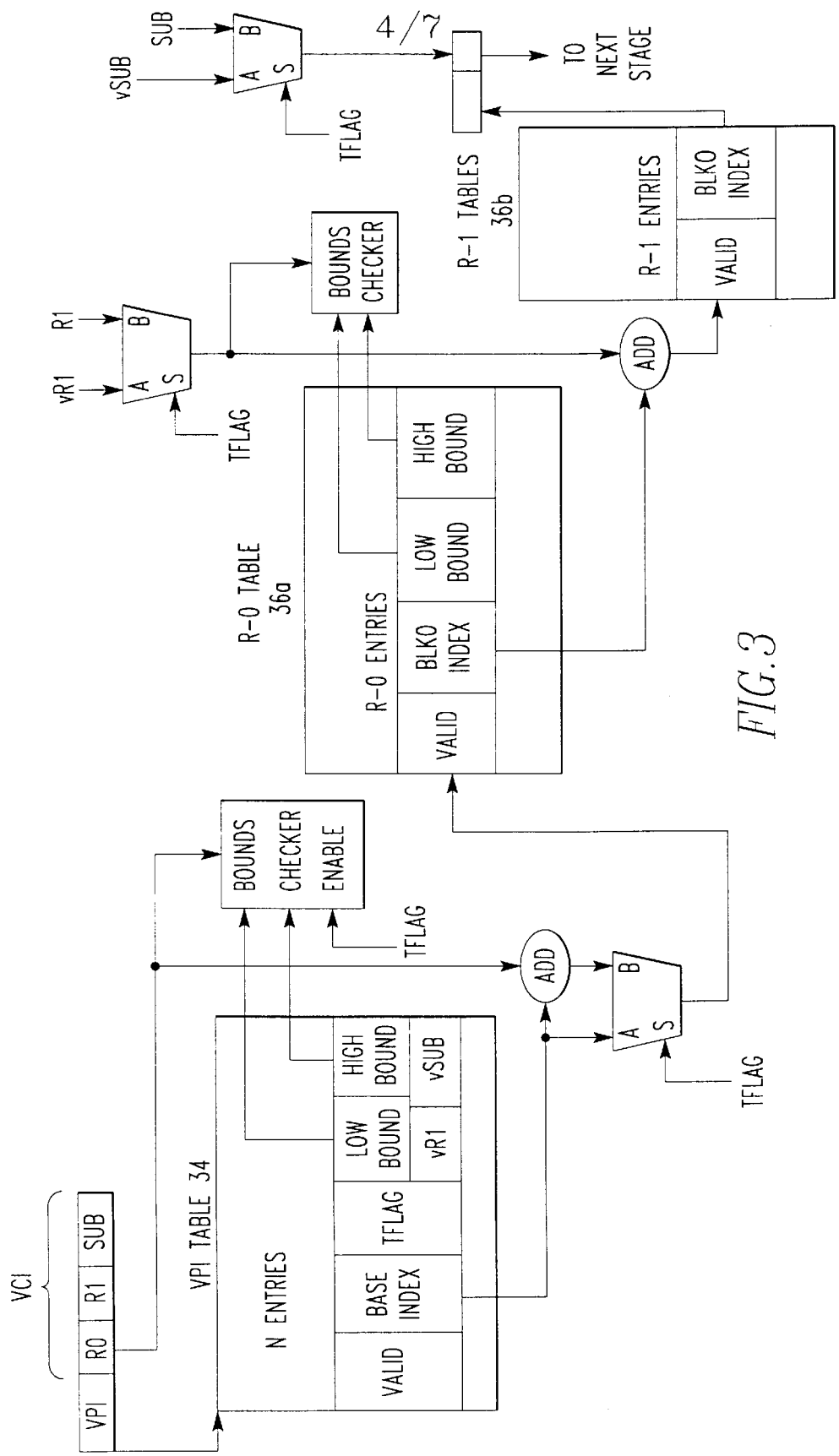
FIG. 3 is a schematic representation of an ATM cell interface having a highest, multiple intermediate, and lowest level table lookup mechanism.

FIG. 3 shows an illustration of this. Additional tables would carry the same form of Table R-0.

The reason nonterminating virtual paths require additional information for extra intermediate tables is as follows. In the initial table explanation, as many nonterminating virtual paths as there are entries in the block of an underlying table could share a table entry. When additional tables are added, one of the primary reasons would be space efficiency. It would be desirable to have an increasing multiple of entries in successive tables. By using non-overlapping sections of the entity being paged (VCI 18 and/or VPI 16), terminating virtual paths can access a span of entries in successive tables. The purpose of the VIRTUAL SUB 66 is to provide nonterminating virtual paths the ability to efficiently utilize the tables. By simply extending the VIRTUAL SUB 66 to consist of multiple fields, one for every table except the first (where an implicit zero is sufficient), enables this.

As stated earlier, if the bounds are implicit, they need not be stored. The lowest level table uses blocks 40 of fixed size. This acts as an implicit bound which need not even be verified by a bounds checker because every possible value has an entry in the underlying table. The entry may not be valid, however this would simply be marked in the entry. This enables the last intermediate table to exclude bounds checking. Should the intermediate tables be similarly managed by fixed sized blocks 40, bounds checkers could be eliminated from the design.

The insertion of multiple tables into the paging mechanism is similar for VPI 16 and VCI 18 lookup.

The lowest layer table may contain a variety of information including:

Cell counters on a per connection basis. This records the number of cells that have gone through the mechanism on a per connection basis.

Routing information for the connection. This would be set up by the system's controller and would thus remain relatively static over the life of the connection. This information could be changed over time if desired.

Header translation. When ATM cells 12 pass through a device, such as a switch, their header may be changed along the path from a source node to a destination 30. Nonterminating virtual paths have only their VPI 16 changed. Terminating virtual paths may have their VCI 18 changed as well.

Bandwidth Enforcement. This can be used to limit the number of cells that arrive within a predefined time period.

Terminating connections that are currently active will store their BASE INDEX 52 into the Range Table and the acceptable bounds of values for the Range. Each underlying element in the Range Table that is currently valid will have an associated block in the Sub Table. Blocks 40 in the Sub Table require a bit per element to denote whether the element is currently valid or not.

Whereas virtual memory systems in CPUs can take several orders of magnitude more time to return data if a page is not currently in physical memory, computer networks require predictable timings for operations such as lookups. For this reason, whenever a block in the lowest level table is in use, it cannot be reclaimed until the connections previously referencing it are removed. Virtual memory systems, on the other hand, can safely swap out a page of memory whose references are currently active.

This will describe the management of a simple implementation of this mechanism containing one intermediate table. The highest level table has an entry for every possible value of the VPI 16. The lowest level table contains the per connection information.

Since blocks 40 in the lowest level table can only be assigned when they are currently inactive, a simple list may be maintained of all blocks 40 that are inactive. Any block can be taken from this list on demand. Similarly, a list may be maintained of all currently unused VPIs. The intermediate tables are more flexible, thus a variety of different mechanisms may be used to track the available space within it.

Figure 4:
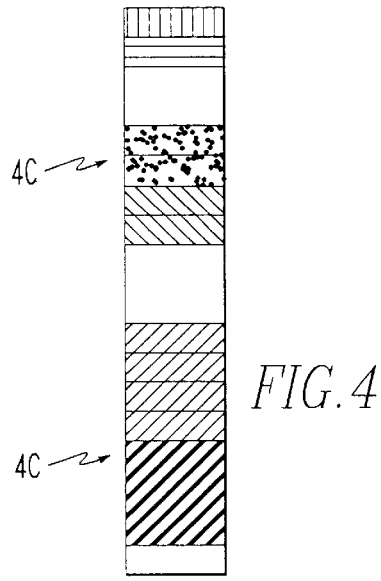
FIG. 4 is a schematic representation of an intermediate level table lookup.

A reasonably efficient method for this would be to manage the intermediate table in regions where all terminated virtual paths have the same number of entries in the Range table 'reserved' for its use. An illustration of this is shown in FIG. 4.

The first section has a minimum number of entries (>=1) per group. The second section has 2× the number of entries per group as the section below it. In general, this holds for all sections, some of which may have no entries. Each section maintains 2 lists, one is a list of all Paths currently using groups in the section, the second is a list of available groups in the section. Each active terminating virtual path will obtain a group from one of the sections.

Since nonterminating virtual paths have unique virtual subs address with a block, the blocks 40 may be fully packed to be filled with nonterminating virtual paths. All of these nonterminating virtual paths share an entry in the intermediate table.

Terminating virtual paths that are currently active will store their BASE INDEX 52 into the VPI Table and the acceptable bounds of values for the Range depending on the section of the Range Table the virtual path currently belongs to. The section the VPI 16 is assigned to simply denotes the number of blocks 40 the VPI 16 may use before it has to be moved into a section with more underlying blocks 40. A VPI 16 can be assigned to a section where 64 entries are available, but only use one. (Note, use of zero blocks 40 denotes an inactive virtual path, which would simply be removed.)

When a terminated virtual path is first established, it is placed into one of the sections, its bounds are set, and the valid flags are set to invalid for all blocks 40 currently not in use. Blocks 40 that are required can be immediately allocated, pending availability of free blocks 40. When new connection establishment requests are submitted, currently allocated blocks 40 for the virtual path should be checked first to determine if any unused entries can be assigned. If no unused entries exist in the assigned blocks 40, a new block will be allocated to the VPI 16. If the VPI 16 was already utilizing every block in its group, the VPI 16 will have to be moved to a new section.

Because the intermediate tables contain only pointers, not actual data, the group of entries in the Range Table can be safely copied to a new section during system operation. Once the data has been copied, the BASE INDEX 52 in the VPI 16 Table can be updated to point to the new location in the Range Table. The lowest level table is not effected by this rearrangement.

If no free groups exist in the desired section (for a move or a path establishment), the following may be done: Move the first group of the next larger section to the first free group within it. If no free groups exist in that section simply repeat. When the next section moves its first group, 2 new groups are created for the previous section. One is used for the currently requested virtual path. When virtual paths are torn down or the path is moved to another group, its previous group is added to the free list of the section it previously belonged to.

To prevent allocation and deallocation of virtual paths from fragmenting the Range Table, software can periodically perform garbage collection as follows: Starting at the first section (that with the smallest group size), move the last group currently in use to the first group on the free list for that section this is repeated until the free list for the section comprises a contiguous range of groups in that section. Pairs of groups at the end of the section may then be assigned to be individual groups at the head of the free list in the next section. This compresses the entries in use and ensures that the intermediate tables are not restricted artificially due to operating transients.

By requiring only three memory references to access the data in the lowest level table, the mechanism may clearly be implemented for use with standard RAM devices.

Nonterminating connections only utilize a single entry in the lowest level table, and can share entries in intermediate tables. This ensures that a large amount of memory is not needlessly wasted to support these types of connections.

By providing a means to manage the memory in terms of blocks 40, the number of VCI 18 entries allocated per terminating virtual path can efficiently be resized without fragmenting the memory. This holds for both allocation and release of blocks 40 to a terminated virtual path.

By enabling the memory to be managed without fragmentation, the memory containing connection information may be efficiently used for prolonged operation of the mechanism.

Figure 5:
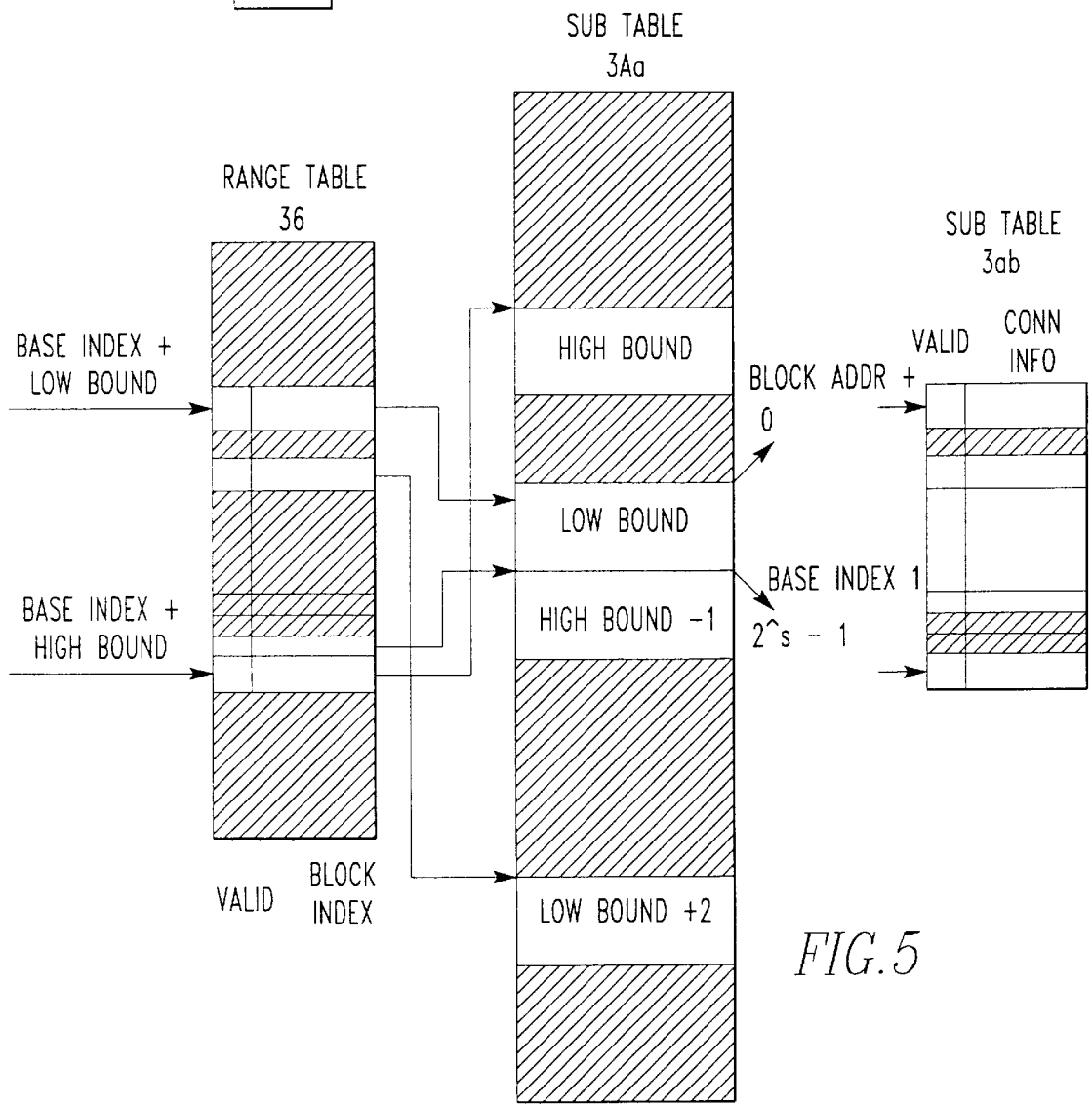
FIG. 5 is a schematic representation of an intermediate level table and a lowest level table having non contiguous blocks.

FIG. 5 illustrates how the Range Table is used for terminated virtual path lookups. Note that while the bounds on the RANGE denote a contiguous region in the Range Table, the entries within the Range table need not be filled contiguously. Note that the slashed region denotes invalid lookup addresses for this terminated virtual path.

The block indicies stored in each valid entry in the Range Table denotes a valid block underneath it. These blocks 40 need not be contiguous with respect to themselves, though the mechanism could be set up in this manner. A VALID flag being enabled for an entry within the Range Table simply denotes that entries may be valid in the subsequent table. One or more entries in the subsequent tables may be valid, each entry in those tables contains its own VALID flag. For example, the expanded view of the block corresponding to the LOW BOUND 62 of the valid RANGE values has a few invalid entries.

The example also shows a situation where a few entries may be required at distant ends of the valid VCI 18 range, with few entries used in between them. Standard bodies, such as ISO, and the ATM Forum might require specific VCI 18 entries to be reserved for use in signaling and/or other purposes whereas applications might require VCI 18 entries at opposite ends of the valid VCI 18 bounds. This mechanism enables this situation to be supported with minimal waste within the tables.

With the addition of a "in use count " field for entries in the Range Table, the management of the Sub Table could be completely automated in hardware. "In use count" specifies how many entries in the Sub Table are in use within a block. The hardware can maintain a linked list of free blocks 40 in the Sub Table.

TABLE 2

Connection Add (Terminating)
Input: VP,VC, connection information
Output: success/Fail - out of range/Fail - out of sub blocks
Operation:
    If(the VCI's range is outside of the bounds for the VPI in the first level table)
        Fails - out of range (the range can be expanded as noted above)
    If(Range Table entry invalid at Base Index + Range)
        allocate new block from Sub Table
        if(there are no free blocks in the Sub Table
            Fails - out of sub blocks (the connection cannot be added because all
            the
            blocks are taken)
    Save connection information
    Set valid bit in Range Table and increment the "in use count"
    Set valid bit in Sub Table
    Return success If used as described above with power of 2 ranges, the hardware can perform relocation of the intermediate table as well.

TABLE 3

Connection Drop (Terminating)
Input: VP, VC
Output: success/Fail - connection not present
Operation:
    Follow the table as if performing a lookup
      Clear the valid bit in the corresponding field of the Sub Table and decrement the "use
        count" in the Range Table
    When the in use count becomes zero, add the Sub Block to the free list of the Sub
      Table and clear the valid bit in the Range Table corresponding to that block
    If(a valid flag B found in the invalid state during a lookup)
        OR (the Range B out of bounds)
      then (you are trying to drop something that does not exist)
        Return failure
      else
        Return success

---

The nonterminating case is somewhat analogous. Software need only maintain the Range Table, the Sub Table will be maintained automatically. Moving entries in the Range Table can be automated by the hardware as well, using the method described above.

The use of bounds and valid flags enables the controller to configure the system such that information in the lowest level table can only be accessed by the connection to which it is associated. Thereby protecting the connection from being corrupted, or its information referenced by, unmapped connections.

There are many ways in which the above mechanism could be implemented. As is shown in table 1, only a few simple instructions are required. The tables could simply reside in a section of the main memory attached to the CPU.

Hardware implementation of the mechanism can be constructed using very few standard components, or could be designed to reside in part of an ASIC, or piece of programmable logic.

For exemplary purposes, a description of how a cell 12 has its connection information looked up by the preferred embodiment of the invention will now be described.

Figure 6:
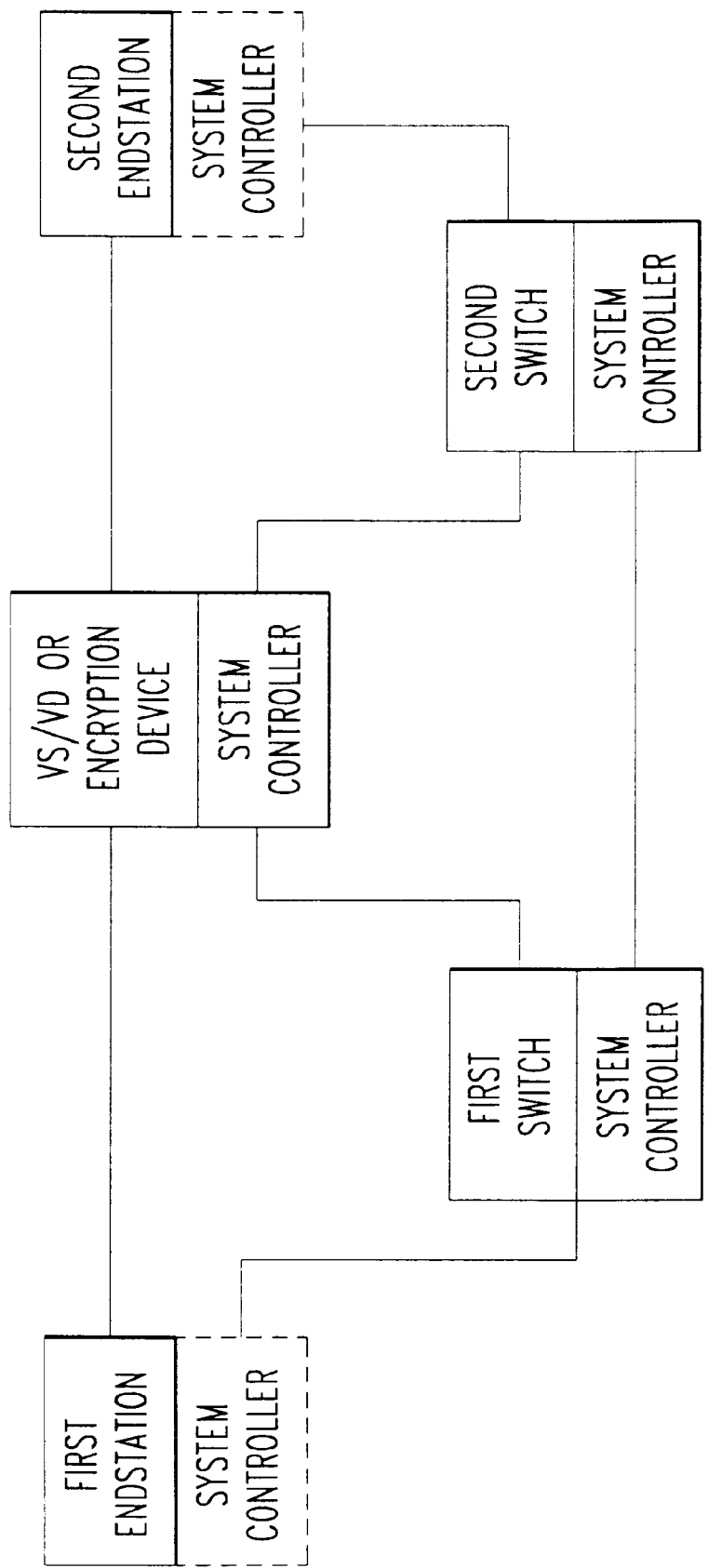
FIG. 6 is a schematic representation of a communication network of the present invention.

Referring to FIG. 6, there is shown a schematic representation of a communication network. The network is composed of a first source or endstation and at least a second source or endstation. The sources can also be destinations here. The endstations may be any form of communication device, such as a computer, a telephone, or a cable TV device, etc. The first endstation communicated to the second endstation through ATM transmission lines. The network is also comprised of at least one switch which direct ATM cells 12 produced by the endstations to their desired destinations. The overall operation of the network is governed by system controllers in communication with all of the devices and endstations in the network.

When the first endstation desires to send an ATM cell 12 to the second endstation, a connection is established through the network which includes at least the value of the VPI 16 and VCI 18 fields of the cell 12 are determined by at least some of the system controllers in the network. The system controllers accomplish this by the necessary ones communicating with each other with respect to the connectivity of the network and identifying a path for the ATM cell 12 to follow from the first endstation to the second endstation. The controllers then create entries in their respective tables in the desired switches, VS/VDs, encryption devices, and other devices in the network so the cell 12 can travel from the first endstation to the second endstation.

Specifically, the controller of the first endstation communicates with the controller of the first switch which communicates with the controller of the second switch which communicates with the controller of the second endstation. Through their respective controllers, the endpoint on an ATM transmission line determine the necessary VPI 16 and VCI 18 information for the ATM cell header to identify the ATM cells 12 of a connection on the link. The first endstation will create the header for ATM cells 12 of the connection according to this communicated information. Moreover, the additional information to complete any additional information needed to establish the connection are also provided in this way.

The switches and/or other devices that are present in the network will use the VPI 16 and potentially the VCI 18 values in the header to identify the connection. The value of the VPI 16 and VCI 18 fields in the header may be modified by the devices routing the ATM cells 12 from their source endstation to their destination endstation as dictated by the aforementioned communication that occurred when the connection was established.

For instance, the controllers identify the first switch as the first destination for the cell 12 to travel from the first endstation to the second endstation. The system controller in the first switch identifies or creates an entry in the first level table. If the range entry would exceed the VPI's previously existing bounds, or this is a newly created terminated VPI 16, then the controller will modify the range table to permit the expansion or addition of the new entry as discussed above.

If the entry in the second level table is currently valid, then a block in the lowest level has already been assigned to its corresponding range of VCI 18 entries and the connection information in the lowest level table need be written for the connection. When the connection information is written to establish a new connection, the valid flag is set to denote the connection is currently present. If the entry in the second level table is not currently valid, then a block in the lowest level table need be allocated for this range of VCI 18 entries. When a block is allocated, its index is written into the second level table which will now be set to be valid to denote the block is in use. The connection information is written in the newly allocated block to the location corresponding to the sub field of the VCI 18 for the newly established connection.

When a connection entry in the Sub Table or a block entry in the Range Table is no longer in use, its valid field is cleared to denote that they are no longer valid lookup entries.

The system controllers at all endpoints in on an ATM transmission path from the source endpoint to the destination endpoint will perform the above.

If the data being sent in an ATM connection are desired to be encrypted, one or more encryption devices may exit along the path from a source endstation to a destination endstation. They can use this lookup mechanism to identify the connection, and perform any necessary encryption/ decryption functions as required. Devices such as VS/VDs and encryption devices need not necessarily modify the ATM cell headers, but would need other connection information to perform their respective functions.

The first endstation then transmits the ATM cell 12 along the transmission lines to the first switch where it is received by the switch and put into a queue therein. At the proper time, the switch determines if the VPI 16 value of the cell 12 is supported in the first level table by reviewing the VALID values of the first level table entry corresponding to the VPI 16 value of the cell 12. If there is no first level table entry associated with the cell 12, then an error signal is produced causing the cell 12 to be eliminated.

Once the VPI 16 value of the cell 12 is deemed to be supported, then the BASE INDEX 52 value of the associated first table entry is provided to the second level table of the first switch. At essentially the same time, a LOW BOUND 62 and a HIGH BOUND 64 value of the first level table entry are provided to the bounds checker along with the Tflag 48 which denotes if the VPI 16 is terminated or not. The Range field of the VCI 18 of the cell 12 is also provided to the bounds checker which, with the LOW BOUND 62 and HIGH BOUND 64 values determine if there is an entry in the Range Table for the Range field of the VCI 18. If the Tflag 48 field is not set, the bounds checker is not used, thus its output is ignored. If Tflag 48 is set, the bounds checker will output a flag denoting whether the Range falls within the denoted bounds. If the bounds are not valid, an error signal is produced, so the cell 12 may be eliminated.

The Tflag 48 value of the first level table entry is used to determine whether the Range field of the VCI 18 should be added to the BASE INDEX 52 or if the BASE INDEX 52 alone should be used as the address for the second level table. Terminating connections will have their Tflag 48 value set, and an addition will be performed. Non-terminated connections will have their Tflag 48 value cleared, thus no addition need be performed.

The switch determines if the connection is supported in the second level table by reviewing the VALID value of the second level table entry corresponding to the address chosen. If there is no second level table entry associated with the cell 12, then an error signal is produced causing the cell 12 to be eliminated.

Once the cell 12 is deemed to be supported in the Range Table, the BLOCK INDEX 56 stored in the second level table is used to specify the block the connection's information may be found in the third level table. The Tflag 48 value of the first level table entry is used to determine whether the Sub field of the cell's VCI 18 or the VIRTUAL SUB 66 stored in the first level table denotes the entry in the block of the third level table where the connection information is stored.

The switch determines if the connection is supported in the third level table by reviewing the VALID value of the third level table entry corresponding to the address chosen. If there is no third level table entry associated with the cell 12, then an error signal is produced causing the cell 12 to be eliminated.

If the connection is deemed to be supported in the Sub Table, the connection information may be used in any manner required for the device in which it is present. i.e. Switches may store routing information and outgoing header information, while encryption devices may need to store keys and remainders needed for cell encoding/decoding.

The Connection Information has been previously set by the system controller of the switch when the connection was established. This method of looking up a cell 12 is repeated at every device along the path from a source endstation to a destination endstation.

One such use of this lookup mechanism besides as a header translation mechanism in a switch is an encryption key server or encryption device 104. When the interface 10 is being used in such a manner, it can be configured where each individual user utilizes either some number of VPIs, or ports for access to the device 104. Since the user is identified by the VPI 16 or port 20, it is attached to the device 104 on, and the elements in the lower level tables are only accessible by the owners of them, keys 106 may safely be stored. Such a device 104 will verify the user based on its Port 20 and/or VPI 16. The intermediate tables are managed by the device 104 itself. If the device 104 is performing encryption functions, the connection information will store both keys and any pertinent remainders needed for any encryption mechanisms that encrypt over full packets (or multiple of them) as opposed to per cell 12. Keys 106 are encryption codes themselves such as the RSA code. Keys and remainders are well known in the art.

Essentially, the encryption device 104 then operates also as a secure system. It operates as a secure system in two ways. The first way is the device 104 only allows certain ports 20 and/or VPI 16 to connect with certain associated sources 68 or destinations 30. Consequently, only those associated sources 68 or destinations 30 have access or are recognized by the encryption device 104. Any other source or destination not having the proper VPI 16 and/or port 20 will ever obtain access to the source 68 or destination 30 with the proper VPI 16 and/or port 20, since the proper VPI 16 and/or port 20 are predefined to be available for access only to an associated source 68 or destination 30.

Alternatively, the secure system 100 can also be accomplished by providing the source with the proper VPI 16 and/or ports 20. Since, in one embodiment, only the predefined source 68, or user at the source 68 has knowledge of the proper VPI 16 and/or port 20, and the proper VPI 16 and/or port 20 are set aside so the encryption device 104 recognizes only cells 12 or packets from the proper source 68, no other request with the proper VPI 16 and/or port 20 from a source 68 other than a predefined source 68 will be granted access to the VPI 16 and/or port 20. This constraint could be relaxed by not requiring the proper VPI 16 and/or port 20 coming from a predefined source 68. Once the encryption key 106 is identified and obtained, it is simply applied to the payload 15, as is well known in the art, to either decrypt an encrypted payload 15 of a cell 12 or encrypt a payload 15 of a cell 12. Furthermore, as is well known in the art, a switch knows to what source or destination each of its ports is connected. A source or destination can be any mechanism which can send or secure an ATM cell, be it a PC properly configured, another switch, a router, or any CPU that can use an ATM cell.

The present invention pertains to a method of secure transmission of ATM cells. The method comprises the steps of identifying a predetermined VPI associated with a first destination and a first source at an encryption device 104. Then there is the step of receiving over an ATM network at the encryption device 104 connected to the ATM network the first ATM cell having the VPI from the first source. Next there is the step of checking whether the first ATM cell is from the first source. Then there is the step of transmitting the first ATM cell to the first destination with the encryption device 104. Next there is the step of receiving at the encryption device 104 a second ATM cell having the VPI from a second source. Then there is the step of checking whether the second ATM cell is from the first source. Next there is the step of discarding the second ATM cell.

After the step of checking whether the first ATM cell is from the first source, there is preferably the step of encrypting a payload of the first ATM cell. The encrypting step preferably includes the steps of locating an encryption key 106 in the encryption device 104 associated with the VPI, and applying the encryption key 106 to the payload to encrypt the payload.

The step of checking whether the first ATM cell is from the first source preferably includes the steps of checking the VPI in a highest level table lookup mechanism 34 in the encryption device 104 to determine if the VPI is present. Then there is the step of producing a first signal corresponding to the VPI. Additionally, the locating step preferably includes the step of locating the encryption key 106 based on the first signal and a VCI 18 of the ATM cell.

The present invention pertains to a method of secure transmission of ATM cells. The method comprises the steps of encrypting a payload of an ATM cell to form an encrypted payload. Next there is the step of transmitting over an ATM network the ATM cell to an encryption device 104 connected to the ATM network. Then there is the step of receiving the ATM cell at the encryption device 104. Next there is the step of checking with the encryption device 104 that the ATM cell has a proper VPI. Then there is the step of obtaining a encryption key 106 in the encryption device 104 associated with the VPI. Next there is the step of encrypting the encrypting payload with the encrypting key to form a decrypted payload. Next there is the step of transmitting the decrypted payload to a destination. Preferably, the checking step can also include the step of checking with the encryption device 104 that the ATM cell has the proper VPI and is from a proper source. The method can, for instance, utilize the steps described above to elaborate on how the ATM cell is transmitted.

Figure 7:
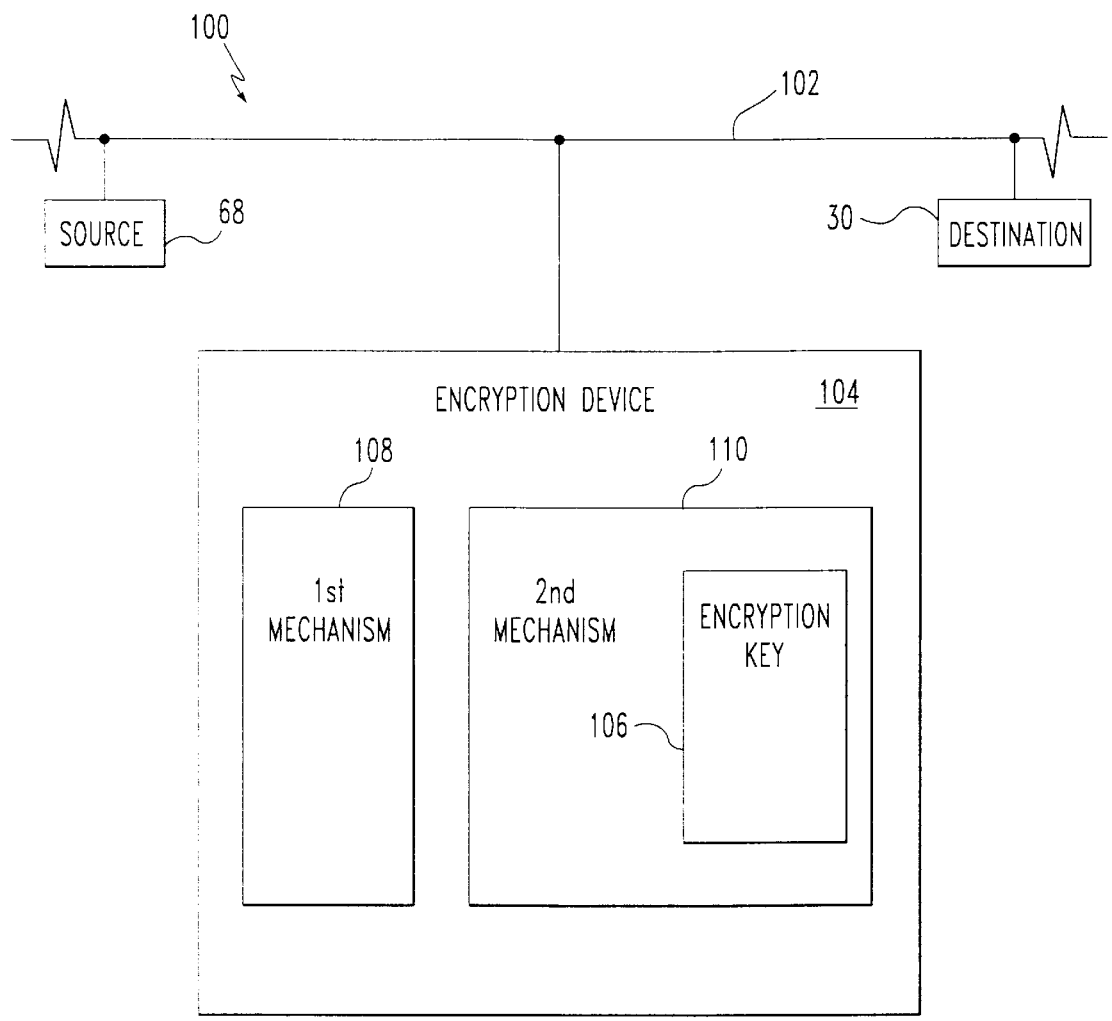
FIG. 7 is a secure system of the present invention.

The present invention pertains to a system 100 for secure transmission of ATM cells, as shown in FIG. 7. The system 100 comprises a source which produces an ATM cell. The system 100 comprises an ATM network over which an ATM cell is transmitted. The source is connected to the ATM network. The system 100 comprises an encryption device 104 connected to the source and the ATM network. The encryption device 104 transmits an ATM cell to and receives an ATM cell from the ATM network. The encryption device 104 has an encryption key 106 associated with a VPI for the source. The encryption device 104 encrypts or decrypts the ATM cell only if the ATM cell has been received by the encryption device 104 from the source and if the ATM cell has the VPI. The system 100 comprises a destination connected to the ATM network and the encryption device 104 for receiving the encrypted cell from the encryption device 104 through the network.

The encryption device 104 preferably has a first mechanism 108 which produces a first signal corresponding to the VPI if the ATM cell has the VPI and is from the source. The encryption device 104 preferably also has a second mechanism 110 which obtains the encryption key 106 corresponding to the first signal and a VCI 18 of the ATM cell. Preferably, the first mechanism 108 includes a highest level table lookup mechanism 34 having a table entry corresponding to the VPI of the ATM cell. The first signal corresponds to the table entry. Preferably, the second mechanism 110 comprises an intermediate table lookup mechanism 32 having an intermediate entry corresponding to the first signal and a range of a VCI 18 of the ATM cell. The intermediate table lookup mechanism 32 produces a second signal corresponding to the intermediate entry. The second mechanism 110 preferably also has a lowest level table lookup mechanism 38 having the encryption key 106 associated with the second signal. The system 100 can essentially use the multi level table lookup mechanism 32 and relationships described above.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An ATM cell interface for dispatching ATM cells, each ATM cell having a header with a VPI field having a value and a VCI field having a value, comprising:

L input ports to which ATM cells enter the interface, where L is greater than or equal to 1 and is an integer;

q output ports through which ATM cells exit the interface, where q is greater than or equal to 1 and is an integer;

a memory mechanism having serial access memory management and having a first table for accessing VPI associated information of the cell, a second table for accessing VCI associated information of the cell, and a third table for accessing connection information for the cell; and a mechanism for directing the ATM cells from an input port of the L input ports to any desired destination through at least one output port of the q output ports, said directing mechanism having entries which identify desired destinations for a corresponding ATM cell, said entries for the corresponding ATM cell distributed from each other with at least one of said entries for the corresponding ATM cell separate and apart from all other of said entries for the corresponding ATM cell, said entries stored in the memory mechanism, the number of possible entries in the directing mechanism being less then a total number of entries supported by the ATM cell header, the directing mechanism produces a first signal based on the value of the VPI field from the first table, a second signal based on the value of the VCI field from the second table and the first signal, and a third signal based on the value of the second signal and the connection information from the third table which is used to route each of the ATM cells from an input port to a desired output port.

2. A cell interface as described in claim 1 wherein the directing mechanism produces a first signal based on the value of the VPI field, a second signal based on the value of the VCI field and the first signal, and a third signal based on the value of the second signal which is used to route each of the ATM cells from an input port to a desired output port.

3. A cell interface as described in claim 1 wherein the directing mechanism is a table lookup mechanism.

4. A cell interface as described in claim 3 wherein the table lookup mechanism comprises a highest level table lookup mechanism which produces the first signal based on the value of the VPI field; an intermediate level table lookup mechanism which produces a second signal based on the value of the VCI field; and a lowest level table lookup mechanism which produces a third signal based on the value of the second signal, said third signal for routing each of the ATM cells from an input port to a desired destination through at least one output port of the q output ports, said memory mechanism comprised of blocks of memory having the entries for the ATM cell, said intermediate level allowing access to the blocks of memory such that the blocks of memory need not be contiguous.

5. A cell interface as described in claim 4 wherein the highest level table lookup mechanism has N table entries, where N is greater than or equal to 1 and is an integer; the intermediate level table lookup mechanism has M intermediate entries, where M is greater than or equal to P and P is greater than or equal to 1 and M and P are integers; and the lowest level table lookup mechanism has P blocks each having at least one connection entry.

6. A cell interface as described in claim 5 wherein each table entry has a TFLAG field which indicates whether an ATM cell that is to be routed from an input port of the L input ports to a desired one of the any destinations through at least one output port of the q output ports travels along a terminating or non terminating connection.

7. A cell interface as described in claim 6 wherein each table entry has a VALID field which indicates whether a value of the VPI field of an ATM cell is defined in the highest local table lookup mechanism.

8. A cell interface as described in claim 7 wherein each table entry has a BASE INDEX having a value of which is used to calculate an address of the intermediate level table lookup mechanism.

9. A cell interface as described in claim 8 wherein each intermediate entry has an intermediate VALID field which indicates whether the intermediate entry is defined in the intermediate table lookup mechanism.

10. A cell interface as described in claim 9 wherein each intermediate entry has a BLOCK INDEX having a value which specifies the block in the lowest level table lookup mechanism having the desired connection entry.

11. A cell interface as described in claim 10 wherein the VCI field of each ATM cell has a RANGE value which is used to locate a desired intermediate entry and a SUB value which is used to locate a desired connection entry when the TFLAG field indicates an ATM cell travels along a terminating connection and each table entry has a LOW BOUND and a HIGH BOUND whose values define a BOUND of acceptable RANGE values for a given VPI value, said RANGE value added to the BASE INDEX to identify an address of an intermediate entry.

12. A cell interface as described in claim 11 wherein each table entry has a VIRTUAL SUB field which is used to locate a desired connection entry when an ATM cell travels along a non terminating connection.

13. A cell interface as described in claim 12 wherein each of the P blocks contains 2 exponent s entries where s is the number of bits in the SUB field.

14. A cell interface as described in claim 13 wherein the intermediate table lookup mechanism comprises a plurality of intermediate table lookups.

15. A method for dispatching an ATM cell having an ATM header in an ATM network comprising the steps of:
storing a first connection entry which identifies a first destination for the ATM cell having the ATM header in serial manner in a first location of a memory mechanism;
storing a second connection entry which identifies a seconded destination for the ATM cell having the ATM header in a serial manner in the memory mechanism at a second location which is not contiguous and separate and apart from the first location, said second connection entry received immediately after the first connection entry;

receiving an ATM cell having the ATM header at the ATM cell interface;
reading the first connection entry;
routing the ATM cell to the destination identified in the first connection entry; and
adding a third connection entry which identifies a third destination for ATM cells having the ATM header in a serial manner in the memory mechanism at a third location which is not continuous with and separate and apart from either the first or second locations.

16. A method as described in claim 15 including after the routing step there is the step of adding a third connection entry which identifies a third destination for ATM cells having the ATM header in a serial manner in the memory mechanism at a third location which is not contiguous with and separate and apart from either the first or second locations.

17. A method as described in claim 15 including after the receiving step there are the steps of producing a first signal based on the value of a VPI field of the ATM header, producing a second signal which designates the first connection entry based on the value of the VCI field, and producing a third signal based on the value of the second signal and the first connection entry, and the routing step includes the step of routing the ATM cell to the destination identified in the first connection entry with the third signal.

18. A method as described in claim 17 wherein the step of producing the first signal includes the steps of locating a table entry in a highest level table lookup mechanism corresponding to the value of the VPI field of the ATM header, and producing a first signal corresponding to the table entry; wherein the step of producing the second signal includes the steps of locating an intermediate level entry in an intermediate level table lookup mechanism corresponding to the value of the VCI field of the ATM header, said intermediate level entry pointing to a connection entry of a lowest level table lookup mechanism, and producing a second signal corresponding to the intermediate level entry; and the step of producing the third signal includes the steps of locating the connection entry based on the value of the second signal, and producing the third signal based on the first connection entry.

19. A method for dispatching an ATM cell having an ATM header in an ATM network comprising the steps of:
locating a table entry in a highest level table lookup mechanism corresponding to a value of a VPI field of the cell, said table entry identifying an intermediate entry in an intermediate level table lookup mechanism having a plurality of intermediate entries;
producing a first signal corresponding to the table entry;
locating the intermediate entry in the intermediate level table lookup mechanism corresponding to the first signal and a value of a VCI field of the cell, said intermediate entry pointing to a connection entry in a lowest level table lookup mechanism, said lowest level table lookup mechanism having connection entries which identify desired destinations for the ATM cell, said intermediate entries allowing access to connection entries in the lowest level table lookup mechanism so the individual connection entries can be stored in any available locations and not contiguously;
producing a second signal corresponding to the intermediate entry;
locating the connection entry in the lowest level table lookup mechanism corresponding to the second signal;
producing a third signal corresponding to the connection entry; and directing the cell to a desired destination corresponding to the third signal.

20. A telecommunications system comprising:

ATM cells, each ATM cell having a header, said header comprising a VPI portion having a field which corresponds to a high level lookup mechanism; and a VCI portion having a field, said VCI portion having a range portion with a field which corresponds to an intermediate table lookup mechanism and a sub portion with a field which corresponds to a lowest level table lookup mechanism;

a source which produces the ATM cells;

a destination which receives the ATM cells; and an interface which routes the ATM cells, said interface in communication with the source and destination, said interface having a highest level table lookup mechanism, an intermediate table lookup mechanism and a lowest level table lookup mechanism.

21. A method for dispatching an ATM cell having an ATM header in an ATM network comprising the steps of:

storing a first connection entry which identifies a first destination for the ATM cell having the ATM header in serial manner in a first location of a memory mechanism;

storing a second connection entry which identifies a seconded destination for the ATM cell having the ATM header in a serial manner in the memory mechanism at a second location which is not contiguous and separate and apart from the first location;

receiving an ATM cell having the ATM header at the ATM cell interface;

reading the first connection entry;

routing the ATM cell to the destination identified in the first connection entry; and adding a third connection entry which identifies a third destination for ATM cells having the ATM header in a serial manner in the memory mechanism at a third location which is not contiguous with and separate and apart from either the first or second locations.

22. An ATM cell interface for dispatching ATM cells, each ATM cell having a header with a VPI field having a value and a VCI field having a value, comprising:

L input ports to which ATM cells enter the interface, where L is greater than or equal to 1 and is an integer;

q output ports through which ATM cells exit the interface, where q is greater than or equal to 1 and is an integer;

a memory mechanism having serial access memory management; and a mechanism for directing the ATM cells from an input port of the L input ports to any desired destination through at least one output port of the q output ports, said directing mechanism having at least three tables which are used for directing the ATM cells, said directing mechanism having entries which identify desired destinations for a corresponding ATM cell, said entries for the corresponding ATM cell distributed from each other in a same table of the three tables with at least one of said entries for the corresponding ATM cell not contiguous with and separate and apart from at other of said entries for the corresponding ATM cell in the same table, said entries stored in the memory mechanism, the number of possible entries in the directing mechanism being less than a total number of entries supported by the ATM cell header, the three tables comprising a first table for accessing VPI associated information of the cell, a second table for accessing VCI associated information of the cell, and a third table for accessing connection information for the cell.

23. A method for dispatching an ATM cell having an ATM header in an ATM network comprising the steps of:

storing a first connection entry which identifies a first destination for the ATM cell having the ATM header in serial manner in a first location of a first table of a plurality of tables which also includes a second table and at least a third table of a memory mechanism, the first table for accessing VPI associated information of the cell, the second table for accessing VCI associated information of the cell, and the third table for accessing connection information for the cell;

storing a second connection entry which identifies a seconded destination for the ATM cell having the ATM header in a serial maker in the memory mechanism at a second location of the first table which is not contiguous and separate and apart from the first location of the first table, said second connection entry received immediately after the first connection entry;

receiving an ATM cell having the ATM header at the ATM cell interface;

reading the first connection entry in the first table with the aide of the second table and the third table; and routing the ATM cell to the destination identified in the first connection entry.

* * * * *